US011104807B2

(12) United States Patent
Czaplik et al.

(10) Patent No.: US 11,104,807 B2
(45) Date of Patent: Aug. 31, 2021

(54) PREPARATION OF RED IRON OXIDE PIGMENT

(71) Applicant: LANXESS Deutschland GmbH, Cologne (DE)

(72) Inventors: Waldemar Czaplik, Viersen (DE); Udo Holtmann, Leverkusen (DE)

(73) Assignee: LANXESS Deutschland GmbH, Cologne (DE)

( * ) Notice: Subject to any disclaimer, the term of this patent is extended or adjusted under 35 U.S.C. 154(b) by 344 days.

(21) Appl. No.: 16/082,651

(22) PCT Filed: Mar. 8, 2017

(86) PCT No.: PCT/EP2017/055381
§ 371 (c)(1),
(2) Date: Sep. 6, 2018

(87) PCT Pub. No.: WO2017/153444
PCT Pub. Date: Sep. 14, 2017

(65) Prior Publication Data
US 2020/0299515 A1 Sep. 24, 2020

(30) Foreign Application Priority Data

Mar. 9, 2016 (EP) ..................... 16159506

(51) Int. Cl.
*C09C 1/00* (2006.01)
*C09C 1/24* (2006.01)
*B01J 8/18* (2006.01)
*B01J 8/22* (2006.01)
*C01G 49/06* (2006.01)

(52) U.S. Cl.
CPC .............. *C09C 1/24* (2013.01); *B01J 8/1854* (2013.01); *B01J 8/226* (2013.01); *C01G 49/06* (2013.01); *B01J 2208/00805* (2013.01); *B01J 2208/00849* (2013.01); *B01J 2208/00884* (2013.01); *C01P 2006/60* (2013.01)

(58) Field of Classification Search
CPC ........... C09C 1/24; B01J 8/1854; B01J 8/226; C01G 49/06; C01P 2006/12; C01P 2004/64
See application file for complete search history.

(56) References Cited

U.S. PATENT DOCUMENTS

| 1,327,061 A | 1/1920 | Penniman et al. |
| 1,368,748 A | 2/1921 | Penniman et al. |
| 2,111,726 A | 3/1938 | Plews |
| 2,937,927 A | 5/1960 | Ayers |
| 3,946,103 A | 3/1976 | Hund |
| 4,753,680 A | 6/1988 | Burow et al. |
| 5,421,878 A | 6/1995 | Lerch et al. |
| 6,056,928 A | 5/2000 | Fetzer et al. |
| 6,179,908 B1 | 1/2001 | Braun et al. |
| 6,503,315 B1 | 1/2003 | Etzenbach et al. |
| 6,616,747 B2 | 9/2003 | Sumita |
| 7,144,455 B2 | 12/2006 | Meisen et al. |
| 7,294,191 B2 | 11/2007 | Rosenhahn et al. |
| 8,206,681 B2 | 6/2012 | Garetto |
| 9,428,402 B2 | 8/2016 | Ketteler et al. |
| 10,221,326 B2 | 3/2019 | Czaplik et al. |
| 2003/0170163 A1 | 9/2003 | Banerjee et al. |
| 2008/0181843 A1* | 7/2008 | Lu .................... B82Y 30/00 423/634 |
| 2016/0272836 A1 | 9/2016 | Czaplik et al. |
| 2017/0253745 A1 | 9/2017 | Czaplik et al. |
| 2017/0267544 A1 | 9/2017 | Czaplik et al. |
| 2017/0292024 A1 | 10/2017 | Czaplik et al. |

FOREIGN PATENT DOCUMENTS

| CA | 2018462 A | 12/1990 |
| CN | 1054088 A | 8/1991 |
| CN | 19981012321 A | 7/1999 |
| CN | 1699477 A | 11/2005 |
| EP | 0059248 A1 | 9/1982 |
| EP | 0645437 B1 | 3/1997 |
| EP | 1106577 A2 * | 6/2001 |
| JP | 6320367 A2 | 1/1988 |
| JP | 2013193939 A2 | 9/2013 |
| KR | 20090104327 A | 10/2009 |
| RU | 2047556 C1 | 11/1995 |
| SU | 1458368 A1 | 2/1989 |

OTHER PUBLICATIONS

Abstract of EP-1106577 A2. (Year: 2001).*
Shen, Qing, et al., "Preparation of crystal seeds of iron oxide red by nitric acid method and its effect on oxidation", Wujiyan Gongye (1997), (6), 5-6, Wujiyan Gonge Bianjib, four pages.
Ullmann's Encyclopedia of Industrial Chemistry, Inorganic Pigments, Chapter 3.1.1, Iron Oxide Pigments, pp. 61-67.
European Search Report from European Application No. 16159506, dated Jun. 28, 2016, two pages.

* cited by examiner

*Primary Examiner* — Steven J Bos
(74) *Attorney, Agent, or Firm* — Nicanor A. Kohncke; Christopher L. McDavid

(57) ABSTRACT

The present invention relates to an improved process for producing iron oxide red pigments by the Penniman process using nitrate (also referred to as nitrate process or direct red process) and apparatuses for carrying out the process.

6 Claims, 7 Drawing Sheets

PREPARATION OF RED IRON OXIDE PIGMENT

The present invention relates to an improved process for producing iron oxide red pigments by the Penniman process using nitrate (also referred to as nitrate process or direct red process) and an apparatus for carrying out this process, and also the use of the apparatus for producing iron oxide red pigments by the Penniman process using nitrate.

Iron oxides are employed in many industrial fields. Thus, for example, they are used as colour pigments in ceramics, building materials, plastics, paints, surface coatings and paper, serve as basis for various catalysts or support materials and can adsorb or absorb pollutants. Magnetic iron oxides are employed in magnetic recording media, toners, ferrofluids or in medical applications, for example as contrast agent for magnetic resonance tomography.

Iron oxides can be obtained by aqueous precipitation and hydrolysis reactions of iron salts (Ullmann's Encyclopedia of Industrial Chemical, VCH Weinheim 2006, Chapter 3.1.1., Iron Oxide Pigments, pp. 61-67). Iron oxide pigments obtained by the precipitation process are produced from iron salt solutions and alkaline compounds in the presence of air. Targeted control of the reaction enables finely divided goethite, magnetite and maghemite particles to be prepared in this way. However, the red pigments produced by this process have a comparatively low colour saturation and are therefore used primarily in the building materials industry.

The aqueous production of finely divided haematite, which corresponds to the modification $\alpha$-$Fe_2O_3$, is, however, considerably more complicated. Use of a ripening step and addition of a finely divided iron oxide of the maghemite modification, $\gamma$-$Fe_2O_3$, or lepidocrocite modification, $\gamma$-FeOOH, as nucleus enables haematite also to be produced by direct aqueous precipitation [U.S. Pat. No. 5,421,878; EP0645437; WO 2009/100767].

A further method of producing iron oxide red pigments is the Penniman process (U.S. Pat. Nos. 1,327,061; 1,368,748; 2,937,927; EP 1106577A; U.S. Pat. No. 6,503,315). Here, iron oxide pigments are produced by iron metal being dissolved and oxidized with addition of an iron salt and an iron oxide nucleus. Thus, SHEN, Qing; SUN, Fengzhi; Wuilyan Gongye 1997, (6), 5-6 (CH), Wujiyan Gongye Blanjib, (CA 128:218378n) have disclosed a process in which dilute nitric acid acts on iron at elevated temperature. This forms a haematite nucleus suspension. This is built up in a manner known per se to give a suspension of red pigment and the pigment is, if desired, isolated from the suspension in a conventional manner. However, the red pigments produced by this process have a comparatively low colour saturation which is similar to the colour saturation of a commercial 130 standard and are therefore primarily used in the building industry. The 130 standard corresponds to the reference standard Bayferrox® 130 customarily used for iron oxide pigment colour measurements. EP 1106577A discloses a variant of the Penniman process which comprises dilute nitric acid acting on iron at elevated temperature to produce nuclei, i.e. finely divided iron oxides having a particle size of less than or equal to 100 nm. The reaction of iron with nitric acid is a complex reaction and can lead to either passivation of the iron and thus cessation of the reaction or to dissolution of the iron to form dissolved iron nitrate depending on the experimental conditions. Both reaction paths are undesirable and the production of finely divided haematite is successful only under specific conditions. EP 1106577A describes such conditions for producing finely divided haematite. Here, the iron is reacted with dilute nitric acid at temperatures in the range from 90 to 99° C. WO 2013/045608 describes a process for producing iron oxide red pigments, in which the reaction step of production of the nuclei, i.e. of finely divided haematite having a particle size of less than or equal to 100 nm, has been improved.

The Penniman process has, according to the prior art, hitherto been carried out on an industrial scale using simple agents. For example, the buildup of the pigment, i.e. the reaction of a haematite nucleus suspension with iron and introduction of air is carried out without mechanical or hydraulic mixing. The introduction of air leads to strong mixing of the reaction mixture here. On the industrial scale (batch size of more than 10 m), the Penniman process using nitric acid is, according to the prior art typically carried out at air introduction volumes of from 7 to 10 $m^3$ per hour and $m^3$ of reaction mixture, resulting in strong convection in the reaction mixture and strong bubble formation, comparable to vigorous boiling of a liquid, at the surface of the reaction mixture being generated. The haematite pigments produced by the Penniman process usually have a full shade a* value of >25 CIELAB units in the surface coating test customary for iron oxide pigments in a long oil alkyd resin which has been made thixotropic (using a method based on DIN EN ISO 11664-4:2011-07 and DIN EN ISO 787-25:2007).

However, these processes which are efficient per se and allow direct production of high-quality red iron oxides with a great variation of the colour values have the following disadvantages:

1. Emission of nitrogen oxides. Nitrogen oxides can be toxic (e.g. the nitrous gases NO, $NO_2$ and $N_2O_4$, generally also referred to as "$NO_x$"), produce smog, destroy the ozone layer of the atmosphere on irradiation with UV light and are greenhouse gases. Dinitrogen monoxide, in particular, is a stronger greenhouse gas than carbon dioxide by a factor of about 300. In addition, dinitrogen monoxide is now considered to be the strongest ozone killer. In the Penniman process using nitric acid, both the nitrous gases NO and $NO_2$ and also dinitrogen monoxide are formed in appreciable amounts.
2. The Penniman process using nitric acid produces nitrogen-containing wastewater which contains significant amounts of nitrates, nitrites and ammonium compounds.
3. The Penniman process using nitric acid is very energy-intensive because large volumes of aqueous solutions have to be heated by introduction of external energy to temperatures of from 60° C. to 120° C. In addition, energy is removed from the reaction mixture by the introduction of relatively large amounts of oxygen-containing gases as oxidants into the reaction mixture (steam stripping), and this has to be introduced again from the outside as heat.

For the purposes of the present invention, nitrogen oxides are nitrogen-oxygen compounds. This group includes the nitrous gases of the general formula $NO_x$ in which the nitrogen can have different oxidation numbers in the range from +1 to +5. Examples are NO (nitrogen monoxide, oxidation number +2), $NO_2$ (nitrogen dioxide, oxidation number +4), $N_2O_5$ (oxidation number +5). $NO_2$ is present in a temperature- and pressure-dependent equilibrium with its dimer $N_2O_4$ (both oxidation number +4). In the following, the term $NO_2$ encompasses both $NO_2$ itself and its dimer $N_2O_4$. $N_2O$ (dinitrogen monoxide, laughing gas, oxidation number +1) also belongs to the group of nitrogen oxides but is not counted among the nitrous gases.

It was therefore an object of the invention to provide an efficient and environmentally friendly process for producing iron oxide red pigments which avoids the abovementioned disadvantages and in which, firstly, iron oxide red pigments having a broad colour spectrum are produced in high yield and, secondly, the proportion of nitrogen oxides given off into the environment and energy given off into the environment is minimized, so that less energy is required for producing the iron oxide red pigments.

The invention accordingly provides a process for producing iron oxide red pigments which achieves this object and also an apparatus in which this process can be carried out, including on an industrial scale, comprising the reaction of at least iron and a water-containing haematite nucleus suspension containing haematite nuclei which have a particle size of 100 nm or less and a specific BET surface area of from 40 $m^2/g$ to 150 $m^2/g$, (measured in accordance with DIN 66131) and an iron(II) nitrate solution and oxygen-containing gas at temperatures of from 70 to 120° C., preferably from 70 to 99° C., producing a liquid reaction mixture which contains at least one liquid phase and haematite suspended therein, wherein the oxygen-containing gas is introduced into the liquid reaction mixture at a gas introduction volume of from 0.5 to 2 $m^3$ of oxygen-containing gas per $m^3$ of reaction volume per hour and a gas introduction volume of from 8 to 32 $m^3$, preferably from 8 to 24 $m^3$, of oxygen-containing gas per $m^3$ of gas introduction area per hour, or a gas introduction volume of from 0.5 to 1 $m^3$ of oxygen-containing gas per $m^3$ of reaction volume per hour and a gas introduction volume of from 8 to 16 m, preferably from 8 to 12 ms, of oxygen-containing gas per $m^3$ of gas introduction area per hour, or a gas introduction volume of from 1 to 2 $m^3$ of oxygen-containing gas per $m^3$ of reaction volume per hour and a gas introduction volume of from 16 to 32 $m^3$, preferably from 24 to 32 m, of oxygen-containing gas per $m^2$ of gas introduction area per hour.

The process of the invention is preferably carried out without additional mechanical mixing, for example without propeller stirrers, and/or without additional hydraulic mixing, for example without pumped circulation of the liquid reaction mixture. In a further preferred embodiment, the process of the invention is carried out with additional mechanical mixing of the liquid reaction mixture, for example by means of a propeller stirrer, and/or by additional hydraulic mixing of the liquid reaction mixture, for example by pumped circulation of the liquid reaction mixture.

In one embodiment, the reaction is carried out until the haematite pigment has the desired colour shade. The desired colour shade is in the case of iron oxide red pigments usually carried out in a surface coating test using a long oil alkyd resin which has been made thixotropic (using a method based on DIN EN ISO 11664-4:2011-07 and DIN EN ISO 787-25:2007). To test the colour values of inorganic colour pigments, the pigment is dispersed in a binder paste based on a non-drying long oil alkyd resin (L64). The pigmented paste is painted into a paste plate and subsequently evaluated colorimetrically in comparison with the reference pigment. Here, the colour coordinates and colour spacings in an approximately uniform CIELAB colour space are determined in full shade and reduction. The a* and b* values in the surface coating test are the most suitable parameters for the colour shade of the pigment. Examples of such colour values and how they are achieved are disclosed in PCT/EP2015/070745.

In a further embodiment, the process of the invention comprises separation of the haematite pigment from the haematite pigment suspension by conventional methods.

The reaction of iron, haematite nucleus suspension and iron(II) nitrate solution in the presence of at least one oxygen-containing gas at temperatures of from 70 to 120° C., preferably from 70 to 99° C., is also referred to as pigment buildup.

For the purposes of the invention, the gas introduction area is defined as the area which is formed by the support for iron. The iron used in the reaction vessel typically rests on the support. This applies particularly when there is an outer delimitation orthogonal to the support for iron, for example in the case when the support for iron and the outer delimitation form a cylinder open at the top or a cuboid open at the top. In an alternative embodiment, the gas introduction area is defined, according to the invention, as the horizontal area within the outer delimitation above which 90% of the volume encompassed by the support for iron and the outer delimitation is present. This applies particularly when an outer delimitation is not orthogonal to the support for iron, for example in the case when the support for iron and the outer delimitation form a funnel open at the top and/or the support for iron is not flat but, for example, arched.

The gas introduction volume of oxygen-containing gas is here defined as the volume which is introduced via suitable devices into the liquid reaction mixture. The reaction volume is defined as the sum of the volume of the liquid reaction mixture and the volume of the iron.

The iron(III) nitrate solutions used in the process of the invention are known from the prior art. On this subject, reference is made to the description of the prior art. These iron(II) nitrate solutions typically have concentrations of from 50 to 150 g/l of $Fe(NO_3)_2$ (reported as $Fe(NO_3)_2$ based on water-free matter). Apart from $Fe(NO_3)_2$, the iron(II) nitrate solutions can also contain amounts of from 0 to 50 g/l of $Fe(NO_3)_3$. However, very small amounts of Fe(NO) are advantageous.

The aqueous haematite nucleus suspensions used in the process of the invention and the haematite nuclei present therein are known from the prior art. On this subject, reference is made to the description of the prior art.

The haematite nuclei present in the water-containing haematite nucleus suspension comprise nuclei having a particle size of 100 nm or less and a specific BET surface area of from 40 $m^2/g$ to 150 $m^2/g$ (measured in accordance with DIN 66131). The criterion of the particle size is satisfied when at least 90% of the haematite nuclei have a particle size of 100 nm or less, particularly preferably from 30 nm to 90 nm. The aqueous haematite nucleus suspensions used in the process of the invention typically comprise haematite nuclei having a round, oval or hexagonal particle shape. The finely divided haematite typically has a high purity.

Foreign metals present in the iron scrap used for producing the haematite nucleus suspension are generally manganese, chromium, aluminium, copper, nickel, cobalt and/or titanium in a variety of concentrations, which can be precipitated as oxides or oxyhydroxides and incorporated into the finely divided haematite during the reaction with nitric acid. The haematite nuclei present in the water-containing haematite nucleus suspension typically have a manganese content of from 0.1 to 0.7% by weight, preferably from 0.4 to 0.6% by weight. Strongly coloured red iron oxide pigments can be produced using nuclei of this quality.

As iron, use is usually made in the process of the invention of iron in the form of wire, sheets, nails, granules or coarse turnings. The individual pieces can have any shape and usually have a thickness (e.g. measured as diameter of a wire or as thickness of a sheet) of from about 0.1 millimetre up to about 10 mm. The size of wire bundles or of sheets used in the process usually depends on practicability. Thus, the reactor has to be able to be filed without difficulty with the starting material, which is generally effected through a manhole. Such iron is produced, inter alia, as scrap or as by-product in the metal processing industry, for example stamping sheets.

The iron used in the process of the invention generally has an iron content of >90% by weight. Impurities present in this iron are usually foreign metals such as manganese, chromium, silicon, nickel, copper and other elements. However, iron having a higher purity can also be used without disadvantages. Iron is typically used in an amount of from 20 to 150 g/l based on the volume of the liquid reaction mixture at the beginning of the reaction according to the invention. In a further preferred embodiment, the iron, preferably n the form of stamping sheets or wires, is distributed on the support for iron over the area thereof with a preferred bulk density of less than 2000 kg/m$^3$, particularly preferably less than 1000 kg/m$^3$. The bulk density can, for example, be achieved by bending sheets of at least one iron grade and/or by targeted laying of the iron. This leads to typically more than 90 percent by volume of the oxygen-containing gas blown in under the iron support passing through the iron support without the oxygen-containing gas banking up under the iron support.

The oxygen-containing gas used in the process of the invention is preferably oxygen or air, either alone or in combination with other gases, for example nitrogen and/or nitrogen oxides. The gas introduction volume of the oxygen-containing gas is measured in m$^3$ by means of suitable devices and divided by the volume of the gas under standard conditions (1013 mbar, 0° C., referred to as standard cubic metres). The gas introduction volume in standard cubic metres is then divided by the volume of the liquid reaction mixture, by the gas introduction area and/or by the time. According to the invention, the parameter "gas introduction volume of the oxygen-containing gas based on volume of the liquid reaction mixture and time" is reported in the unit "ms of oxygen-containing gas/m$^3$ of liquid reaction mixture/hour" and the parameter "gas introduction volume of the oxygen-containing gas based on gas introduction area and time" is reported in the unit "m$^3$ of oxygen-containing gas/m$^3$ of gas introduction area/hour". If more than one gas is fed separately into the liquid reaction mixture, the gas introduction volumes of the individual gases are added up and divided by the other parameters "volume of the liquid reaction mixture", "gas introduction area" or "time".

In the process of the invention, the hematite pigment suspension and a nitrogen oxide-containing stream are formed. This nitrogen oxide-containing stream typically comprises from 1 to 200 g/m$^3$ of nitrous gases (calculated as g/m$^3$ of NO$_2$, based on water-free gas) and/or from 0.5 to 50 g/ms of N$_2$O (based on water-free gas). The content of nitrous gases and dinitrogen monoxide can fluctuate within a wide range in these streams. This nitrogen oxide-containing stream usually has a water content which usually corresponds to water vapour saturation at the given reaction temperature. For example, the proportion of water in the nitrogen oxide-containing stream is about 50% by weight at a reaction temperature of 80° C. Since the nitrogen oxide-containing stream is given off from the aqueous reaction mixture, which usually has a temperature of from 70 to 120° C., preferably from 70 to 99° C., the nitrogen oxide-containing stream has the same temperature on leaving the aqueous reaction mixture. After exit from the aqueous reaction mixture, the nitrogen oxide-containing stream comes into contact with parts of the reaction apparatus which have a different temperature, in general a lower temperature. As a result, condensation of the water present in either gaseous or vapour form in the nitrogen oxide-containing stream can occur. This alters the water content in the nitrogen oxide-containing stream, and possibly also the content of NO$_x$ and/or N$_2$O dissolved therein. For the purposes of the present invention, the content of NO$_x$ and/or N$_2$O is for this reason determined and reported in % by weight based on water-free gas. In practice, a sample of the gas to be measured is firstly passed through a cooling device, for example a gas wash bottle cooled with ice water, so that the dried gas has a temperature of not more than 40° C. In this case, the water content typically drops to from 40 to 50 g of water vapour/m$^3$ of air. The gas composition in respect of the components NO$_x$, N$_2$O and O$_2$ and optionally N$_2$ is subsequently measured. The determination of the proportions by weight of the individual gases is described in more detail in the section of the description "Examples and Methods".

In one embodiment, the reaction according to the invention of the iron, the haematite nucleus suspension containing haematite nuclei which have a particle size of 100 nm or less and a specific BET surface area of from 40 m$^2$/g to 150 m$^2$/g (measured in accordance with DIN 66131) and the iron(III) nitrate solution in the presence of at least one oxygen-containing gas at temperatures of from 70 to 120° C., preferably from 70 to 99° C., is carried out by providing the iron on a support for iron by the iron being distributed uniformly with a preferred bulk density of less than 2000 kg/m$^3$, particularly preferably less than 1000 kg/m, on the support for iron. The iron distributed on the support for iron will also be referred to as iron bed. The bulk density of the iron bed can be achieved by bending at least one iron grade and/or by targeted laying of the iron. The iron is here laid on the support for iron in such a way that the at least one oxygen-containing gas can flow through the intestices between the iron pieces in order to come into contact with the iron. The support for iron makes exchange of at least the reaction mixture and the oxygen-containing gas through openings present in the support possible. Typical embodiments of the support for iron can be sieve trays, perforated trays or meshes. The ratio of the cumulated area of openings to the total area of the support for iron is typically at least 0.1. The upper value of the ratio of the cumulated area of openings to the total area is determined by the technical boundary conditions set down by the iron located on the support for iron 14, for example size and shape of the iron pieces and weight of the iron bed. The ratio of the cumulated area of openings to the total area of the support for iron 14 is preferably as great as possible. The openings required for the reaction mixture to flow through the support for iron are typically suitable for selection of the iron raw materials. Iron falling through the support is typically largely avoided thereby. The support for iron can correspond to the diameter of the internal diameter of the reactor or be made smaller. The diameter of the support for iron is preferably smaller than the internal diameter of the reactor. In this case, an outer delimitation which prevents iron from failing down is installed on the support device for iron.

This outer delimitation can be suspension-permeable, for example configured as mesh, or suspension-impermeable and correspond, for example, to the shape of a tube or a cuboid open at the top. Possible openings in the outer delimitation are designed so that iron is prevented from falling through. Preference is given to an impermeable wall, at least in the lower region, for example 10-50% of the height of the delimitation. In the upper region, for example from 50% to 90% of the height of the outer delimitation, measured from the support for iron, lateral openings, e.g. in the form of meshes, holes, which prevent iron from failing down and makes suspension exchange possible, can be present. This has the advantage that the reactor can be operated with different reaction volumes, which naturally lead to different fill levels of the reactor. Even when the surface of the liquid reaction mixture is lower than the upper edge of the outer delimitation, exchange of the liquid reaction mixture from the space within and outside the outer delimitation can occur through the openings in the outer delimitation.

The delimitation is typically desired in such a way that when carrying out the process of the invention, not more than 10% by volume of the oxygen-containing gas introduced into the liquid reaction mixture gets from the inside of the delimitation through the openings of the delimitation to the other side of the delimitation.

The introduction of the at least one oxygen-containing gas into the reaction mixture preferably takes place by means of a gas introduction unit underneath the support for iron, so that the at least one oxygen-containing gas flows through the iron bed. Relative to the height of the reactor, a gas introduction unit is preferably located in the lower half, preferably in the lower third, of the reactor. The iron oxide red pigments produced by the process of the invention have the haematile ($\alpha$-$Fe_3$) modification and are therefore also referred to as haematite pigments in connection with the present invention.

The invention additionally encompasses apparatuses suitable for carrying out the process of the invention. These are described in more detail below with the aid of FIGS. 1 to 7.

Figure 1:
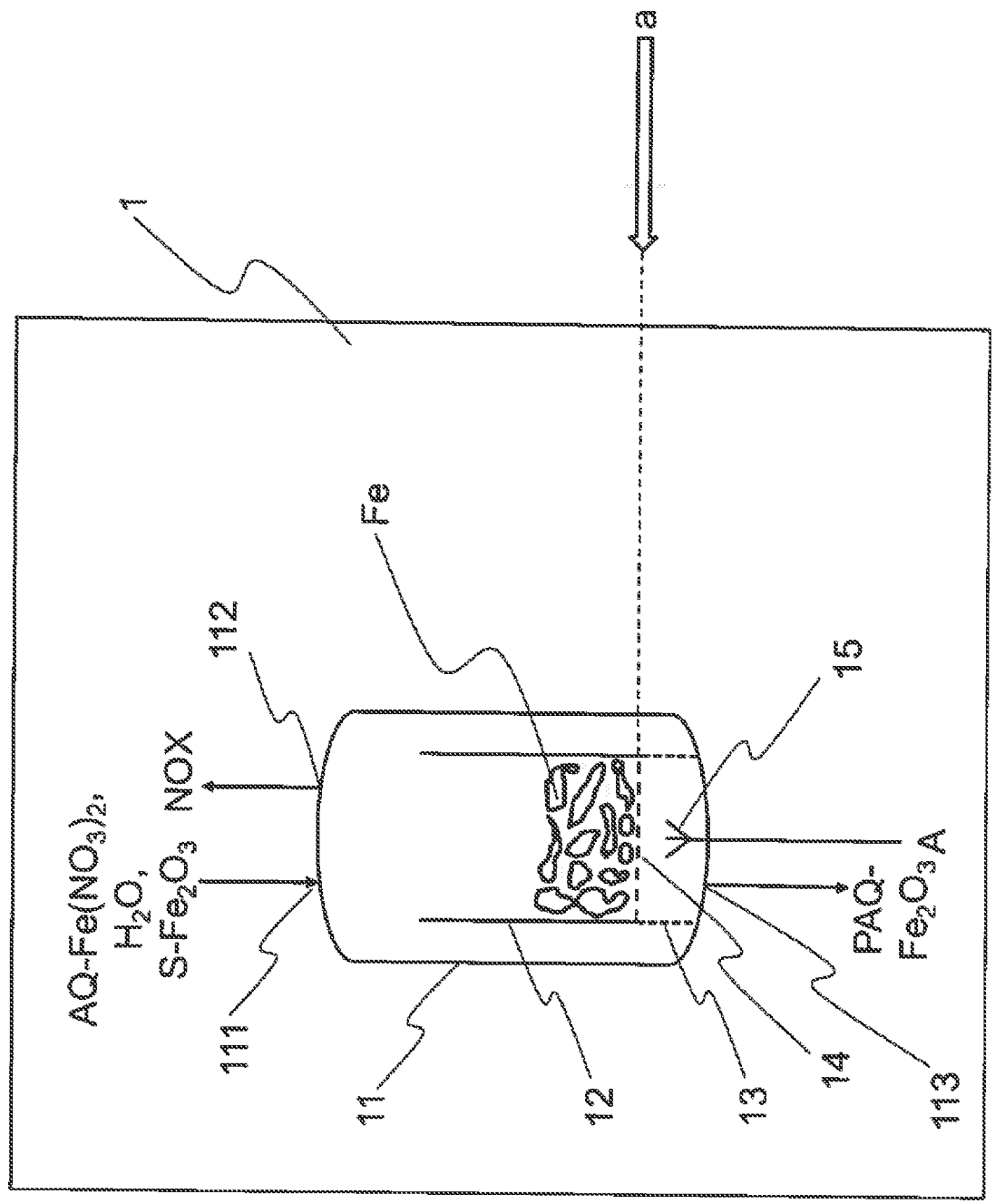
FIGS. 1, 2, 5 and 6 depict an embodiment of a reactor according to the invention as side view of a central vertical cross section.

The invention thus provides an apparatus comprising at least one reactor 1, in which the process of the invention is carried out. The abovementioned embodiments are described in more detail for the reactor 1.

In the figures, the symbols have the following meanings:
A oxygen-containing gas
Fe iron
AQ-$Fe(NO_3)_2$ iron(II) nitrate solution
S—$Fe_2O_3$ haematite nucleus suspension
PAQ-$Fe_2O$ haematite pigment suspension
$H_2O$ water
NOX nitrogen oxide-containing stream (offgas from the production of the haematite pigment suspension)
GA gas introduction area
DGA diameter of the gas introduction area GA
RA internal area of the reaction vessel 11
DRA Internal diameter of the reactor
1 reactor for producing haematite pigment suspension
11 reaction vessel
12 outer delimitation
13 holder for 12 and 14
14 support for iron
15 gas introduction unit
21 compartment
111 inlet for iron(II) nitrate solution, haematite nucleus suspension and optionally water
112 outlet for NOX
113 outlet for haematite pigment suspension
211 feed conduit from compartment 21 to the reaction vessel 11
212 discharge conduit from compartment 21 to the reaction vessel 11

Reactor 1 typically comprises one or more reaction vessels made of materials which are resistant to the starting materials. Simple reaction vessels can be, for example, masonry-lined or tiled vessels let into the earth. The reactors also comprise, for example, containers made of glass, plastics which are resistant to nitric acid, e.g. polytetrafluoroethylene (PTFE), steel, e.g. enamelled steel, plastic-coated or painted steel, stainless steel having the material number 1.44.01. The reaction vessels can be open or closed. In preferred embodiments of the invention, the reaction vessels are closed. The reaction vessels are typically designed for temperatures in the range from 0 to 150° C. and for pressures of from 0.05 MPa (0.05 megapascal corresponds to 0.5 bar) to 1.5 MPa (1.5 megapascal corresponds to 15 bar).

One embodiment of a reactor 1 is shown in FIG. 1. Reactor 1 has at least one reaction vessel 11, outer delimitation 12 of the support for iron 14, holder 13 for 12 and 14, gas introduction unit 18 for the at least one oxygen-containing gas A, inlet 111 for iron (II) nitrate solution, haematite nucleus suspension and optionally water, outlet 112 for a nitrogen oxide-containing stream NOX and outlet 113 for the haematite pigment suspension.

In one embodiment, the outer delimitation 12 is typically formed by an impermeable wall, a wall provided with openings, by mesh rods, a sieve or a combination thereof. Possible openings in the delimiting wall should be designed so that iron is prevented from falling through. Preference is given to a wall which is impermeable to the liquid reaction mixture, at least in the lower region, for example 10-50% of the height of the delimitation 12, measured from the support for iron 14. In the upper region, for example from 50% to 90% of the height of the delimitation 12, measured from the support for iron 14, lateral openings, e.g. in the form of meshes, holes, which prevent iron from falling down and make exchange of suspension possible, can be present. The delimitation is typically designed so that when carrying out the process of the invention, not more than 10% by volume of the nitrogen oxide-containing stream gets from the inside of the outer delimitation 12 through the openings of the outer delimitation 12 to the other side of the outer delimitation 12. However, this is generally prevented by the airlift pump effect brought about by the upwards-flowing gas in the interior space formed by the outer delimitation 12.

The upper edge of the outer delimitation 12 is preferably below the surface of the reaction mixture which adjoins the gas space located above the reaction mixture, in particular when it has no lateral openings (mesh, holes, sieve) for mass transfer. When the upper edge of the outer delimitation 12 is above the surface of the reaction mixture which adjoins the gas space above the reaction mixture and the outer delimitation 12 is suspension-permeable, no exchange of the liquid reaction mixture between the volumes within and outside the delimitation 12 is possible. This leads to the proportions of the liquid reaction mixture located within and outside the outer delimitation only being able to mix with one another via the support for iron, which could lead to a deterioration in the space-time yield, the product yield and the product quality. According to the invention, the "gas introduction volume per unit area per unit time" in the unit "m³ of oxygen-containing gas per m² of gas introduction area per hour" based on the area formed by the support for iron 14 is measured.

Figure 3:
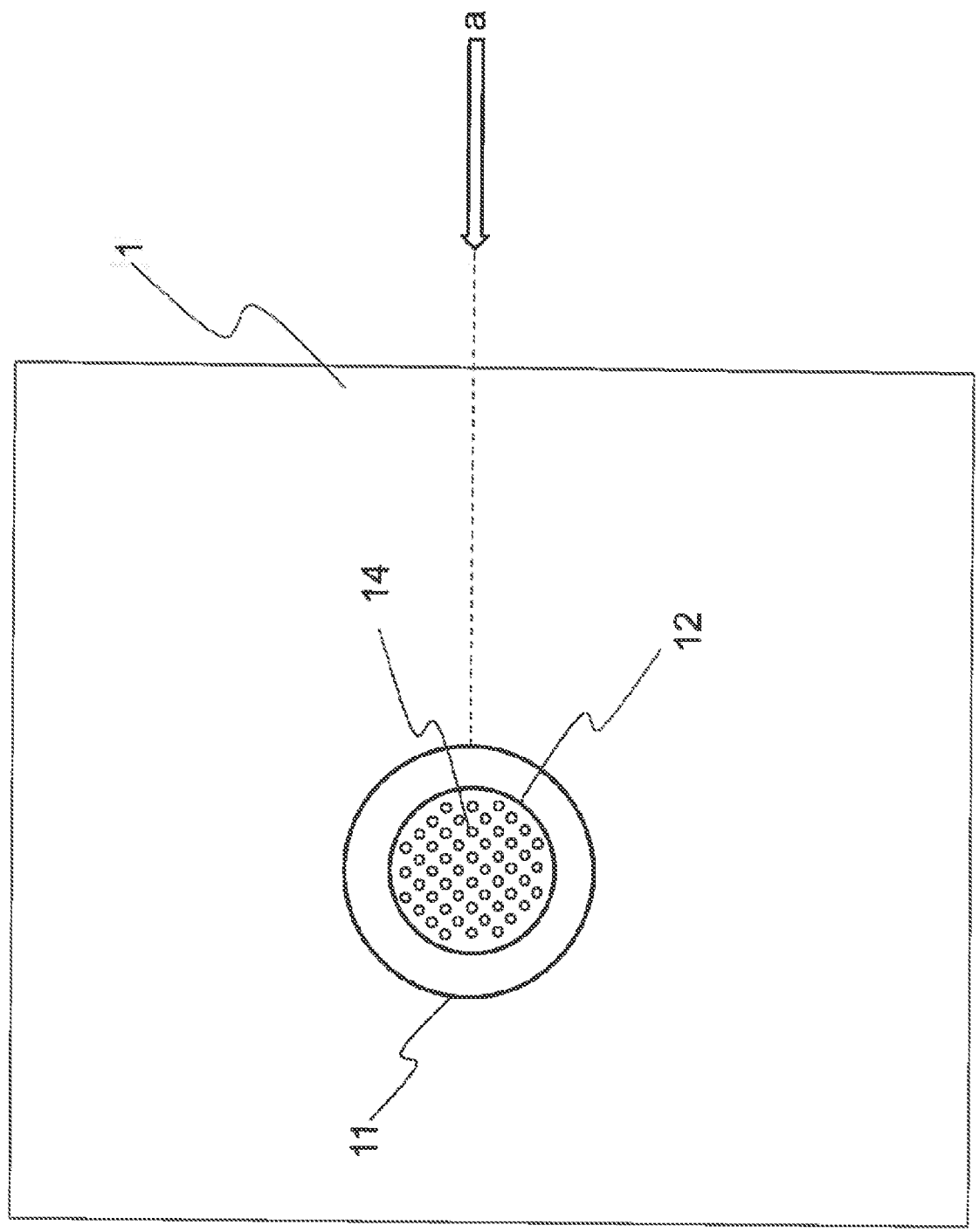
FIG. 3 shows a plan view of the horizontal cross section of the reaction vessel 11 of FIG. 1 at the height of the support for iron 14.
Figure 5:
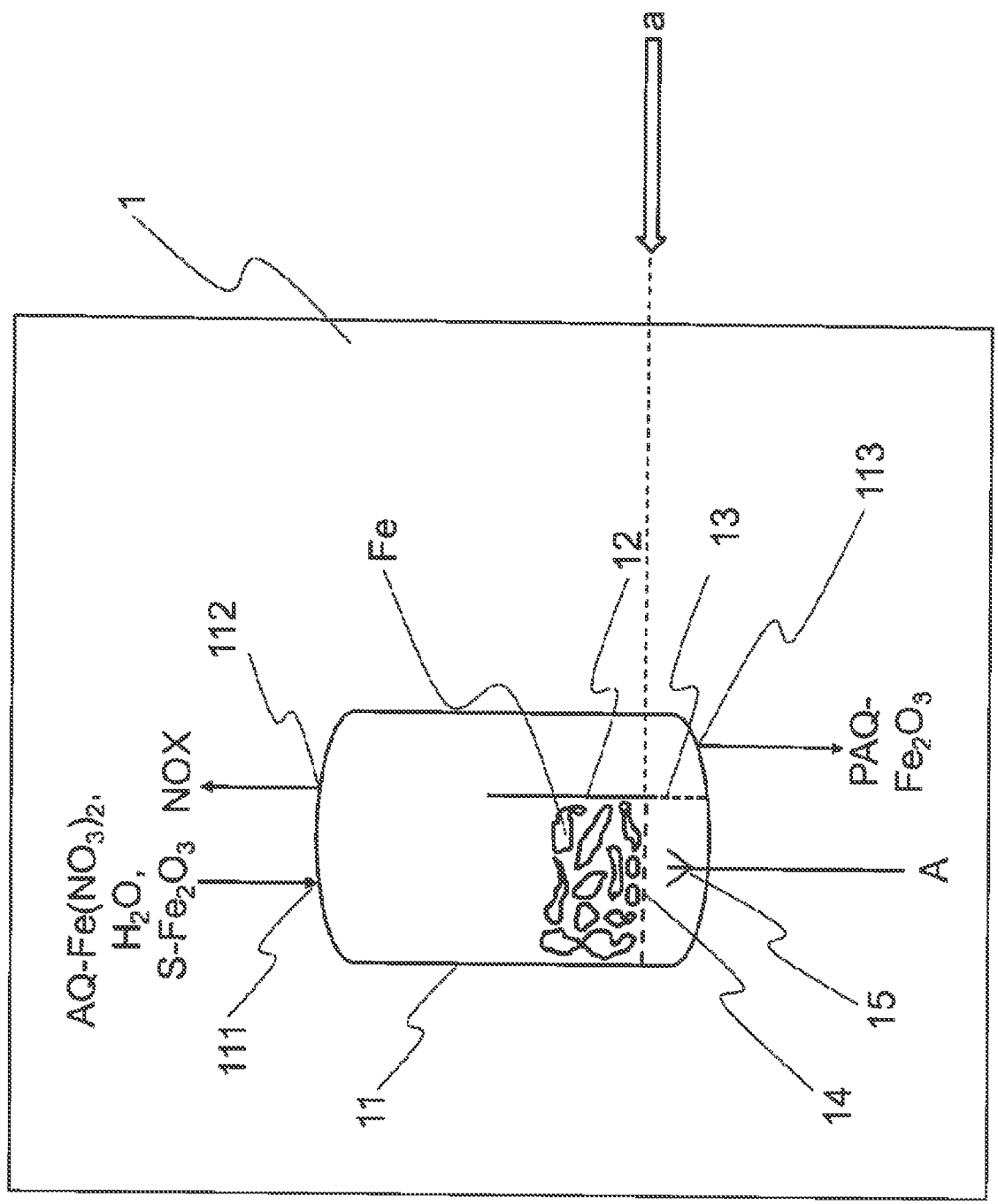
Figure 6:
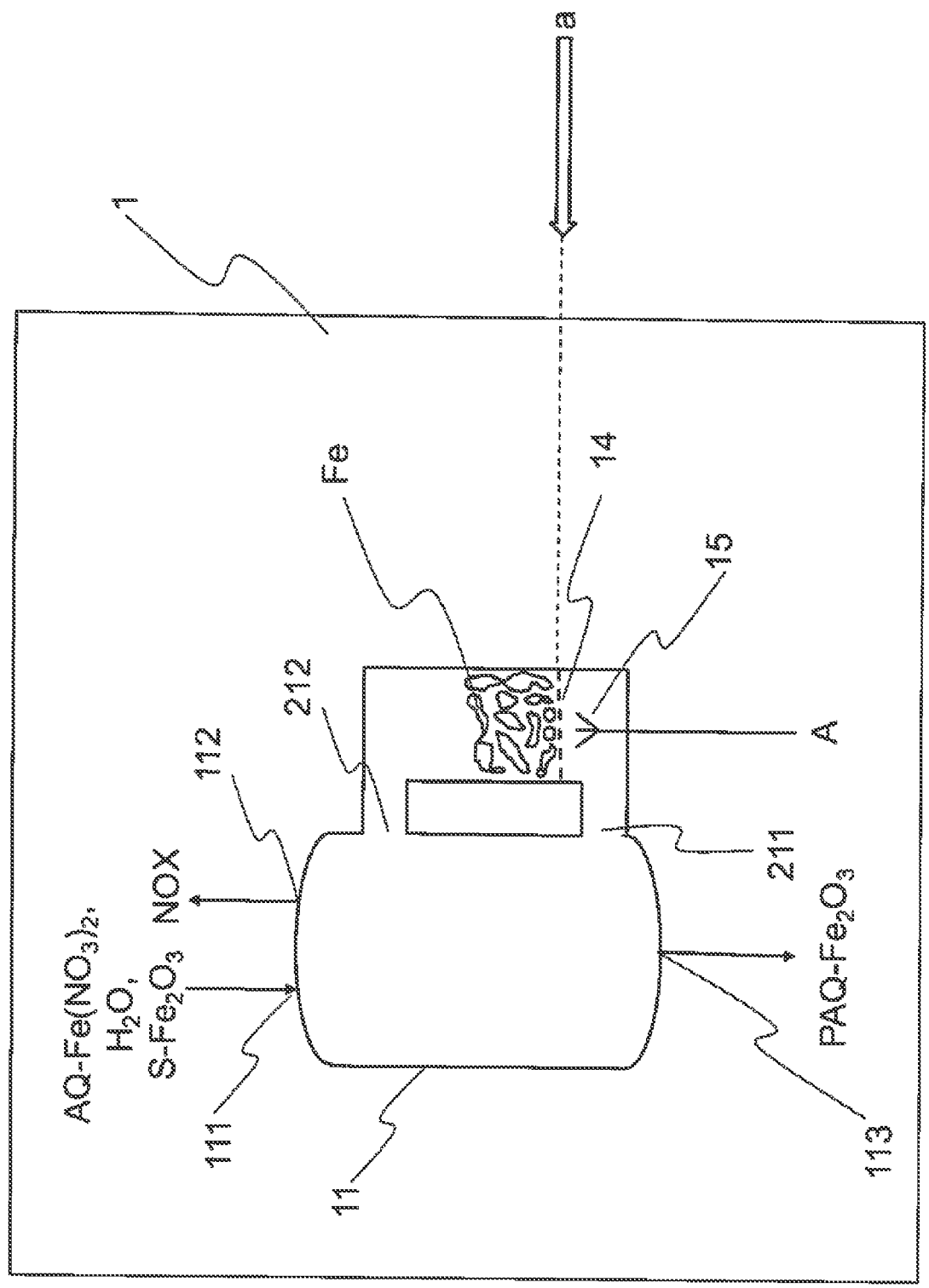

In FIGS. 1, 5 and 6, which depict a side view of a vertical section of the reactor 1, the direction of view denoted by the marking a is marked by an arrow. FIG. 3 shows a horizontal cross section of the reaction vessel 11 of FIG. 1 as plan view at the height of the support for iron 14. In FIG. 1, the outer delimitation 12 has the shape of a cylinder open at the top and the bottom. Here, the support for iron 14 has the area GA with the diameter DGA. The area GA defines the gas introduction area.

In various embodiments, the support for iron 14 and thus also the outer delimitation 12 can have various shapes, for example circular, oval, triangular, quadilateral, pentagonal or polygonal (in each case based on the horizontal cross section of the outer delimitation 12). The gas introduction area GA thus also has the corresponding shape. The support for iron 14 and the outer delimitation 12 and thus also the gas introduction area GA are preferably circular or oval. The support for iron 14 and the outer delimitation 12 are likewise preferably orthogonal to one another. The area of the support for iron and the horizontal area within the outer delimitation above which 90% of the volume enclosed by the support for iron and the outer delimitation is located are in this case identical.

Figure 2:
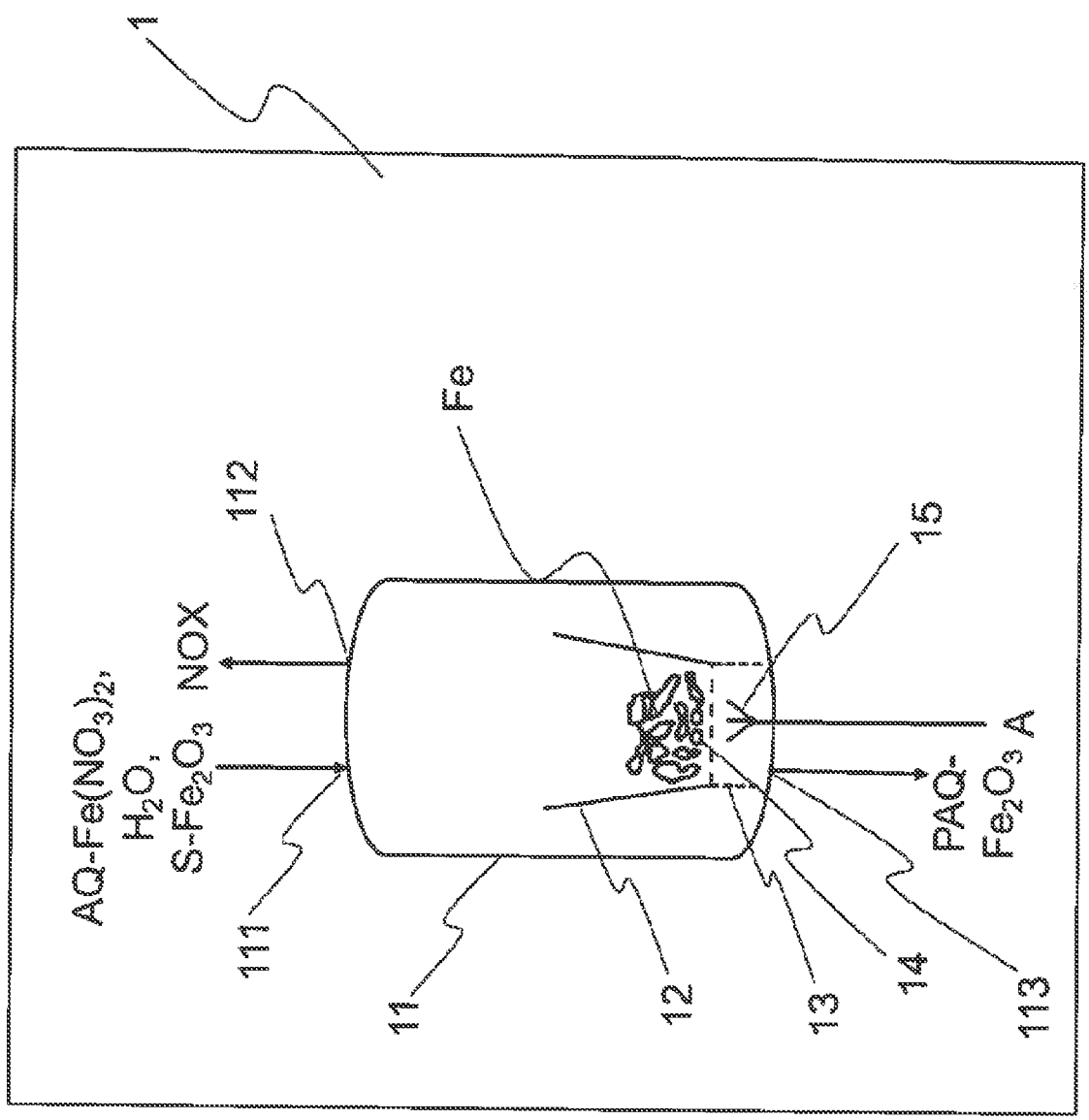

In further embodiments, the outer delimitation 12 can have different diameters at different heights. For example, in FIG. 2 the outer delimitation 12 widens conically in an upwards direction and forms a funnel open at the top. In these cases, the support for iron 14 and the outer delimitation 12 are not orthogonal. Here, the horizontal area within the outer delimitation 12 above which 90% of the volume enclosed by the support for iron and the outer delimitation is located defines the parameter gas introduction area.

Figure 4:
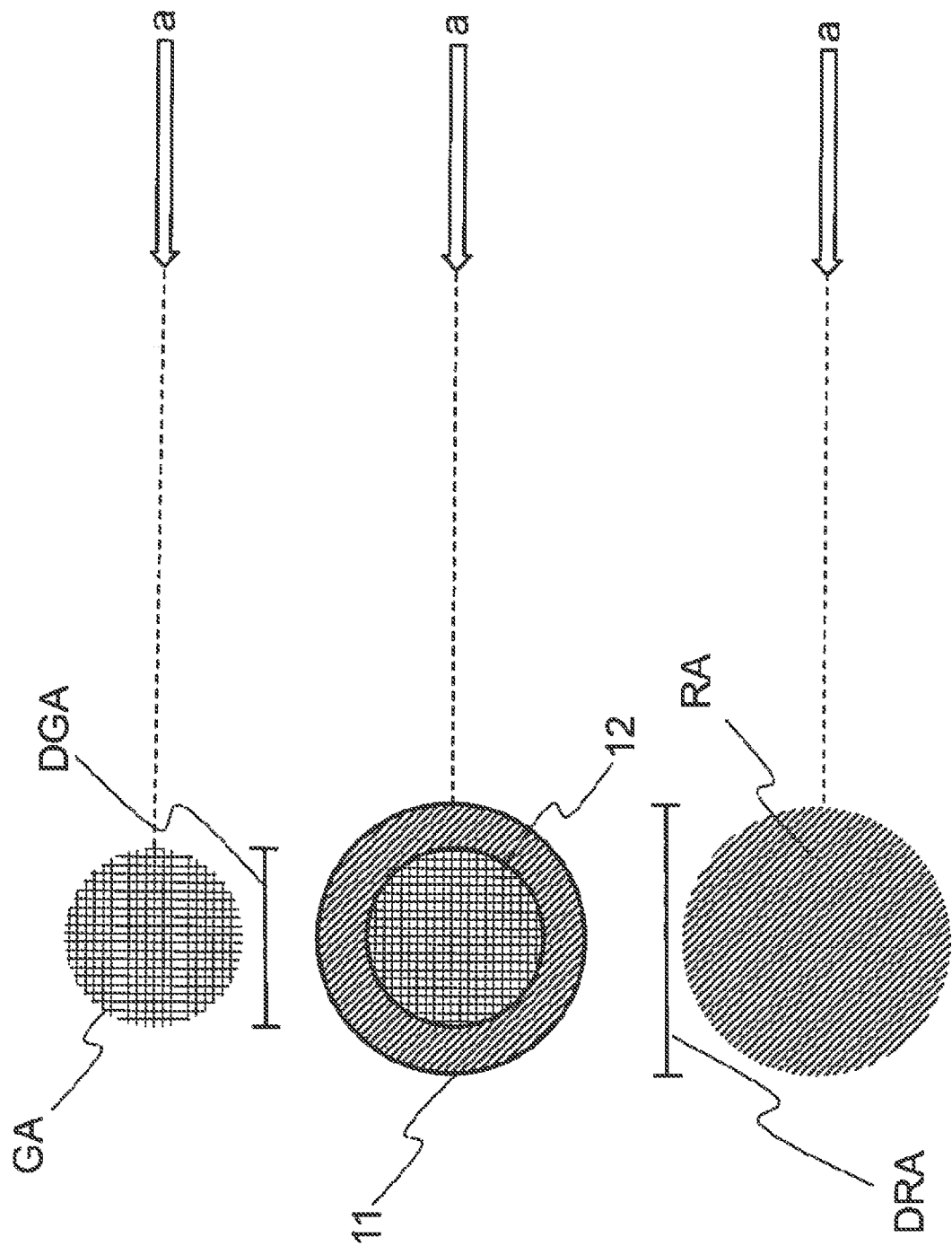
FIG. 4 shows a plan view of the horizontal cross section at the areas GA and RA at the height of the planes a of the reaction vessel 11.

FIG. 4 depicts a plan view of the horizontal cross section of the reaction vessel 11 of FIG. 1 and of the outer delimitation 12 at the height of the support for iron 14, which is formed by the inner edge of the outer delimitation 12 (direction of view a). The area formed by the support for iron 14 is the gas introduction area GA which has a diameter DGA and is shown as cross-hatched area in the upper part of FIG. 4. The area formed by the circumference of the inner surface of the reaction vessel 11 is the reactor area RA which has a diameter DRA and is depicted as hatched area in the lower part of FIG. 4.

The support for iron 14 allows exchange of at least the liquid reaction mixture and the oxygen-containing gas through openings present in the support. Typical embodiments of the support for iron 14 can be sieved trays, perforated trays or meshes. The ratio of the cumulated area of openings to the total area of the support for iron is typically at least 0.1. The upper value of the ratio of the cumulated area of openings to the total area is determined by the technical boundary conditions which are set down by the iron present on the support for iron 14, for example size and shape of the iron parts and weight of the iron bed. The ratio of the cumulated area of openings to the total area of the support for iron 14 is preferably as great as possible. The openings required for the reaction mixture to flow through the support for iron are typically suitable for the selection of the iron raw material. Falling of the iron through the support is typically largely avoided thereby. The gas introduction area GA is preferably smaller than the area RA.

The gas introduction area is configured so that a gas introduction volume of from 8 to 32 m, preferably from 8 to 24 m³, of oxygen-containing gas per m² of gas introduction area per hour is achieved at a gas introduction volume of from 0.5 to 2 m³ of oxygen-containing gas per m³ of reaction volume per hour, or a gas introduction volume of from 8 to 16 m³, preferably from 8 to 12 m³, of oxygen-containing gas per m² of gas introduction area per hour is achieved at a gas introduction volume of from 0.5 to 1 m³ of oxygen-containing gas per m³ of reaction volume per hour, or a gas introduction volume of from 16 to 32 m³, preferably from 24 to 32 m³, of oxygen-containing gas per m² of gas introduction area per hour is achieved at a gas introduction volume of from 1 to 2 m³ of oxygen-containing gas per m of reaction volume per hour. Depending of the dimensions of the reactor, the percentage of the reactor area made up by the gas introduction area is different. The lower the reactor volume, the smaller does the percentage of the gas introduction area based on the reactor area have to be. The percentage of the gas introduction area based on the reactor area can be calculated by dividing the intended value "m³ of oxygen-containing gas per m² of gas introduction area per hour", for example 8 m³ of oxygen-containing gas per m² of gas introduction area per hour, by the intended value "m³ of oxygen-containing gas per m³ of reaction volume per hour", for example 1 m³ of oxygen-containing gas per m³ of reaction volume per hour, with a value of 8 m being obtained in this example and the height of the reaction volume in the reactor being divided by this value. At an illustrative height of the reaction volume of 1.05 m at a reaction volume of 1 m=, the percentage of the gas introduction area based on the reactor area is 13% (calculated by 1.05 m:8 m). At an illustrative height of the reaction volume of 5.09 m at a reaction volume of 100 in, the percentage of the gas introduction area based on the reactor area is 64% (calculated by 5.09 m:8 m).

The gas introduction unit 15 is located underneath the support for iron 14 and consists, for example, of one or more sparging rings, perforated pipes, ring-shaped pipes, pipes installed in a star shape, two-fluid sprayers (injectors, ejectors) or gas introduction mats. The gas introduction unit 15 can also be integrated into the support for iron 14. Integration of the gas introduction unit 15 into the support for iron 14 is, for example, effected by the sparging unit being mechanically joined directly to the support or being configured as a mesh which is made up of perforated tubes and simultaneously serves as support for iron.

The introduction of gas preferably takes place underneath the support for iron 14, so that the gas flowing out from the gas introduction unit 15 goes through the iron bed. Relative to the reactor height, the gas introduction unit is preferably located in the lower half, preferably in the lower third, of the reactor.

In the embodiment shown in FIG. 1, the gas introduction unit 15 is installed underneath the support for iron 14. This ensures that 90 percent by volume or more of the at least one oxygen-containing gas A flows through the support for iron 14 and through the iron Fe and only less than 10 percent by volume of the at least one oxygen-containing gas A flows through the holder 13 and then between the wall of the reaction vessel 11 and the outer delimitation of the gas introduction area 12 in the direction of the surface of the liquid reaction mixture. However, this is generally prevented by the airlift pump effect which is brought about by the upwards-flowing gas in the interior space formed by the outer delimitation 12. The introduction of the at least one oxygen-containing gas underneath the support for iron 14 results in formation of a gas stream directed in the direction of the surface of the reaction mixture, which leads to convection of the liquid reaction mixture past the iron located on the support for iron 14. The at least one oxygen-containing gas flowing into the reaction mixture partly dissolves in the reaction mixture. The proportions of the at least one oxygen-containing gas dissolved in the reaction mixture partially react with the other components of the reaction mixture, as a result of which dissolved ammonium compounds and/or nitrogen oxides are also formed in the reaction mixture. Part of the nitrogen oxides in turn reacts with the reaction components. Part of the at least one oxygen-containing gas and of the nitrogen oxides formed leave the reaction mixture as nitrogen oxide-containing stream NOX.

In one embodiment, the support for iron 14 is typically a sieve or mesh which is mechanically joined to the holder 13 and the outer delimitation 12.

In a further embodiment, the holder 13 is a wall which is partly liquid- and/or gas-impermeable, preferably consisting partly or entirely of a mesh or sieve.

In a further embodiment, the holder 13 consists of struts which are joined to the bottom or the side wall of the reaction vessel 11.

In a further embodiment, the support for iron 14 is mechanically joined over its entire circumference to the outer delimitation 12 and the holder 13, as depicted in FIG. 1. While the process of the invention is being carried out, an upward-directed stream arises within the outer delimitation 12 and a downward-directed stream arises in the space between the outer delimitation 12 and the inner wall of the reactor 11, so that the liquid reaction mixture is circulated past the iron.

In a further embodiment, the support for iron 14 is mechanically joined at only part of its circumference to the outer delimitation 12 and the holder 13 and mechanically joined around the other part of its circumference directly to the reaction vessel 11, as shown in FIG. 5. While the process of the invention is being carried out, an upward-directed stream arises between the outer delimitation 12 and the wall of the reaction vessel 11 above the support for iron 14 and a downward-directed stream arises between the outer delimitation 12 and the wall of the reaction vessel 11 at the side of the support for iron 14, so that the reaction mixture is circulated past the iron.

Figure 7:
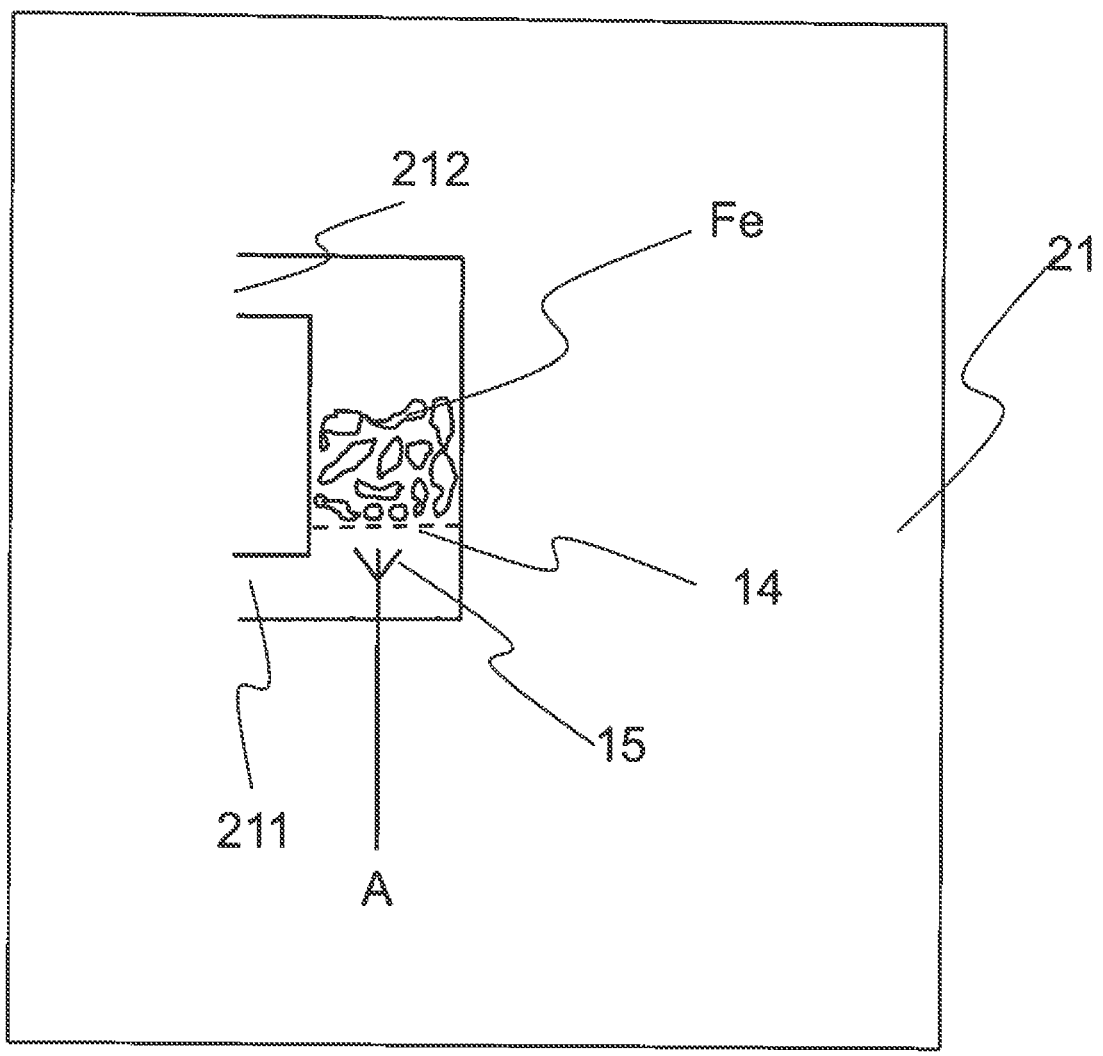
FIG. 7 shows a compartment 2 of a reactor 1.

In a further embodiment, the support for iron 14 and the gas introduction unit 15 are present in at least one separate compartment 21 of the reaction vessel 11, as depicted in FIGS. 6 and 7. The at least one separate compartment 21 is connected by a feed conduit 211 and a discharge conduit 212 to the reaction vessel 11. The feed conduit 211 and the discharge conduit 212 are preferably located underneath the surface of the reaction mixture which adjoins the gas space in the reactor. In this embodiment, the gas introduction area GA is, as in the above-described embodiments as per FIGS. 1 and 5, identical to the area of the support for iron 14. If a plurality of separate compartments are present, the parameter "$m^3$ of gas introduction volume of oxygen-containing gas per $m^2$ of gas introduction area per hour" is calculated from the ratio of the sums of the individual gas introduction volumes of the individual compartments to the sum of the gas introduction areas of the individual compartments.

In alternative embodiments, inlet 111 and/or outlet 112 and/or outlet 113 in the reaction vessel 11 can also be configured so that they are formed by the same opening, by in each case an inlet or outlet for each individual starting material and/or product or by any combination thereof.

In further embodiments, the reactor 1 additionally comprises a mixer (not depicted in the figures), for example a propeller mixer, and/or a pump which withdraws the liquid phase from the reactor at an outlet and feeds it back into the reactor at an inlet at another point via a conduit. In a further preferred embodiment, heating (not depicted in the figures) can be provided directly in the reaction vessel 11, for example as heating mantle, heating plug and/or as heating coil, or be effected by direct introduction of hot water and/or pressurized steam into the liquid reaction mixture.

In the following, the procedure for carrying out the process of the invention will be described by way of example. To carry out the process of the invention, the starting materials iron, optionally water, iron(II) nitrate solution and haematite nucleus suspension are introduced via an inlet, for example the inlet 111, into the reaction vessel, for example reaction vessel 11. The reaction mixture is heated to a temperature of from 70 to 120*C, preferably from 70 to 99° C. Haematite is precipitated onto the haematite nucleus by oxidation by means of oxygen-containing gas, with the oxygen-containing gas being introduced into the liquid reaction mixture at a gas introduction volume of from 0.5 to 2 $m^3$ of oxygen-containing gas per $m^3$ of reaction volume per hour and a gas introduction volume of from 8 to 32 $m^3$, preferably from 8 to 24 $m^3$, of oxygen-containing gas per $m^2$ of gas introduction area per hour, or a gas introduction volume of from 0.5 to 1 $m''$ of oxygen-containing gas per $m^3$ of reaction volume per hour and a gas introduction volume of from 8 to 16 $m^3$, preferably from 8 to 12 $m^3$, of oxygen-containing gas per $m^3$ of gas introduction area per hour, or a gas introduction volume of from 1 to 2 $m^3$ of oxygen-containing gas per $m^3$ of reaction volume per hour and a gas introduction volume of from 16 to 32 $m^3$, preferably from 24 to 32 ms, of oxygen-containing gas per $m^2$ of gas introduction area per hour, and the size of the haematite nucleus increases during the reaction until the iron oxide red pigment has attained the desired colour shade. The haematite pigment suspension PAQ-Fe$_2$O produced in this way is either temporarily stored in an optional storage vessel (not depicted in the figures) and/or transported directly through an outlet, for example outlet 113, and via a conduit which communicates with the reaction vessel into a separation apparatus (not shown in the figures) in which the pigment is separated from the reaction mixture. In a preferred embodiment, the additional mechanical mixing, for example by means of a propeller stirrer, and/or by means of additional hydraulic mixing, for example by pumped circulation of the liquid reaction mixture of the liquid reaction mixture is excluded or not.

During the process of the invention, the pigment is built up on the haematite nucleus present in the liquid phase, producing a haematite pigment suspension whose colour values, preferably the a* and b* values in surface coating testing, change during the reaction as a result of the changing particle size and/or morphology during pigment buildup. The point in time at which the process of the invention is stopped is determined by measuring the colour values of the haematite pigment present in the haematite pigment suspension. The process of the invention is stopped when the haematite pigment has the desired colour shade, preferably the desired a* and b* values in full shade or with reduction, in surface coating testing. This is effected by ending the introduction of gas, optionally by simultaneous cooling of the reaction mixture to a temperature of less than 70° C. Typical reaction times for the reaction according to the invention are from 10 to 150 hours, depending on the desired colour shade.

The haematite pigment suspension produced in this way for example the haematite pigment suspension PA-Fe$_2$O$_3$, is either temporarily stored in an optional storage vessel (not depicted in the figures) and/or transported directly through an outlet, for example the outlet 113, and via a conduit into a separation apparatus (not depicted in the figures) in which the pigment is separated from the reaction mixture.

In a preferred embodiment, the haematite pigment is separated from the haematite suspension by conventional methods, preferably by filtration and/or sedimentation and/or centrifugation, after the reaction according to the invention. Washing of the filter cake obtained after the separation and subsequent drying of the filter cake are likewise preferably carried out. One or more sieving steps, particularly preferably using different mesh openings and decreasing mesh openings, are likewise preferably carried out before separation of the haematite pigment from the haematite pigment suspension. This has the advantage that foreign bodies, for example metal pieces, which would otherwise contaminate the haematile pigment are separated off from the haematite pigment suspension.

The separation of the haematite pigment from the haematite pigment suspension can be carried out using al methods known to those skilled in the art, e.g. sedimentation with subsequent removal of the aqueous phase or filtration through filter presses, for example membrane filter presses.

In a preferred embodiment of the process of the invention, at least one sulphate salt, for example iron(II) sulphate and/or an alkali metal sulphate or alkaline earth metal sulphate, preferably iron(II) sulphate and/or sodium sulphate, can be added to the haematite pigment suspension during or before sieving and/or during or before the separation. This has the advantage that sedimentation of the haematite pigment from the haematite pigment suspension is accelerated. This assists the subsequent isolation of the haematite pigment. Furthermore, the buildup reaction can be carried out further when iron(II) sulphate is used. Precipitation of residual iron by means of sodium hydroxide solution subsequently takes place, with the pH being set while introducing air by addition of an alkaline precipitant (e.g. NaOH, KOH, CaCO$_3$, NaCO$_3$, K$_2$CO$_3$, etc.) to pH 3.5 to 6, preferably 4-5, until the iron(II) content is <0.1 g/l. After precipitation is complete, the introduction of gas is stopped and the pH is set to pH 4-6 by further addition of the alkaline precipitant.

At least one wash of the sediment or filtercake separated off in this way is then optionally carried out. Drying of the haematite pigment which has been separated off in this way, for example by means of filter dryers, belt dryers, kneading dryers, spin flash dryers, drying ovens or spray dryers, is optionally carried out after the separation and/or wash. Drying is preferably carried out by means of belt dryers, plate dryers, kneading dryers and/or spray dryers.

It has surprisingly been found that a significantly smaller amount of nitrogen oxides are given off into the gas phase in the process of the invention than in the process according to the prior art in which the pigment buildup is carried out at significantly greater gas introduction volumes per reaction volume per hour. In addition, significantly less energy, compared to the prior art, is carried out into the gas phase from the reaction mixture which has been heated to from 70 to 120° C., preferably from 70 to 99° C., and then has to be introduced again as external energy, for example in the form of steam, into the reaction mixture due to the smaller gas introduction volumes. In the process according to the prior art, in which gas introduction amounts of 10 m$^3$ of gas volume/m$^3$ of reaction volume/hour of reaction time are used, 1.7 kg of Fe$_3$O$_3$ are usually produced per kg of Fe(NO$_3$)$_2$. Compared to the process of the prior art, at least the same proportion or a greater proportion of the Fe$^{3+}$ present in the haematite pigment comes from the iron and either the same proportion or a smaller proportion of the Fe$^{3+}$ present in the haematite pigment comes from the Fe(NO$_3$)$_2$ in the process of the invention. More than 1.7 kg of Fe$_2$O$_3$% per kg of Fe(NO$_3$)$_2$, preferably from 1.8 to 2.5 kg of Fe$_2$O$_3$ per kg of Fe(NO$_3$)$_2$, are produced by means of the process of the invention. If the proportion of the Fe$^{3+}$ originating from the iron in the haematite pigment is greater, the process is more economical since less iron(II) nitrate solution, which in contrast to the iron used has to be produced separately, is required for producing the same amount of haematite.

The process of the invention and the apparatus of the invention in which the process of the invention is carried out thus make it possible to produce iron oxide red pigments by the Penniman process using nitrate in high quality, in high yields, in an energy efficient way and with avoidance of offgases which contain undesirable reaction products such as nitrous gases or laughing gas.

EXAMPLES AND METHODS

Titration of Iron(I) and Iron(III) Determination:

The content of iron(II) nitrate can be determined indirectly by measuring the iron(II) content by a potentiometric titration of a sample solution acidified with hydrochloric acid using cerium(III) sulphate.

NO$_x$ Measurement

NO$_x$ measurements were carried out using a gas analyser PG 250 from Horriba, (chemiluminescence method). Information about NO$_x$ formation was reported as a ratio to the pigment yield (calculated as NO$_2$, in g of NO$_2$/kg of pigment). The gas sample is dewatered by means of a cold trap in the gas analyser. The NO$_x$ emission arising in the production of the starting materials haematite nucleus and iron nitrate is not included.

N$_2$O Measurement

For sample preparation, a sample of the gas to be measured is firstly passed through a cooling apparatus, for example a gas wash bottle cooled with ice water, so that the dried gas has a temperature of not more than 40'C. Here, the proportion of water typically drops to from 40 to 50 g of water vapour/m$^3$ of air. Laughing gas measurements were carried out by means of a quantitative gas-chromatographic determination and/or by infrared measurement. Information about N$_2$O formation was reported as a ratio to the pigment yield (g of N$_2$O/kg of pigment). The N$_2$O emission arising in the production of the starting materials haematite nucleus and iron nitrate is not included.

O$_2$ Measurement

For sample preparation, a sample of the gas to be measured is firstly passed through a cooling apparatus, for example a gas wash bottle cooled with ice water, so that the dried gas has a temperature of not more than 40° C. Here, the proportion of water typically drops to from 40 to 50 g of water vapour/m of air. The measurement of the oxygen content in the dried nitrogen oxide-containing stream is carried out, for example, by means of an electrochemical sensor which can selectively determine the oxygen concentration in the gas mixture. Measurement of the oxygen content in the dried nitrogen oxide-containing stream can also be carried out by other methods. Since the oxygen content is an absolute quantity which can be determined absolutely by comparison with reference samples, a person skilled in the art will here use only methods which have been validated by means of reference samples.

N₂ Measurement

For sample preparation, a sample of the gas to be measured is firstly passed through a cooling apparatus, for example a gas wash bottle cooled with ice water, so that the dried gas has a temperature of not more than 40° C. Here, the proportion of water typically drops to from 40 to 50 g of water vapour/m° of air. The measurement of the nitrogen content in the dried nitrogen oxide-containing stream is carried out by gas chromatography. For this purpose, gas samples are taken, e.g. by filling evacuated gas sample bottles with offgas, and determined quantitatively by gas chromatography. Measurement of the nitrogen content in the dried nitrogen oxide-containing stream can also be carried out by other methods. Since the nitrogen content is an absolute quantity which can be determined absolutely by comparison with reference samples, a person skilled in the art will here use only methods which have been validated by means of reference samples.

Example 1: (Comparison)

69.9 kg of iron sheet having a thickness of about 1 mm were placed in a 1 m³ reactor (internal diameter 1.0 m) equipped with circular sieve trays (mesh opening about 10 mm) having a diameter of 0.98 m and a resulting area of 0.75 m² and a sparging ring. The sparging ring (20 cm diameter) was installed underneath the sieve tray, with the iron sheet being uniformly distributed on the sieve tray. Water, iron(II) nitrate solution and haematile nucleus suspension were subsequently introduced in such amounts that a volume of 1000 litres was attained and the concentration of nucleus (as $Fe_2O_3$) was 21 g/l and the concentration of iron nitrate (calculated as anhydrous $Fe(N_2)_2$) was 44 g/l. The mixture was heated to 85° C. and after reaching the temperature sparged with 10 m³/h of air (13 m³ of air/m of gas introduction area/h) for 94 hours. The reaction mixture is subsequently filtered through a filter press and the haematite pigment obtained is washed with water. The haematite pigment is subsequently dried at 80° C. to a residual moisture content of less than 5% by weight. The dried filtercake is subsequently broken up mechanically by means of a shredder. The haematite pigment is in this way obtained in powder form in a yield of 93.1 kg (corresponds to 1.7 kg of $Fe_2O_3$ per kg of $Fe(NO_3)_2$). The parameter "kg of $Fe_2O_3$ per kg of $Fe(NO_3)_2$" is determined by measuring the volume of the liquid reaction mixture and the concentration of $Fe(NO_3)_2$ after the reaction is complete. The amount of $Fe(NO_3)_2$ consumed in the reaction, which is reported as a ratio to the amount of haematite pigment obtained, is calculated from the amount of $Fe(NO_3)_2$ introduced before the reaction and the amount of $Fe(NO_3)_2$ remaining alter the reaction.

Examples 2 to 7

Examples 2 to 7 were carried out in the same reactor on a comparable scale, with the identical conditions and the identical relative ratios of the amounts of the starting materials to the volumes of the solutions being set. The only parameter varied was the gas introduction volumes. The results of the experiments are reported in Table 1.

Example 8 (According to the Invention)

A cylindrically shaped insert (sidewalls without openings) having sieve trays (mesh opening about 10 mm) and a diameter of 0.28 m and a height of 0.8 m was installed in a reaction vessel having a useable volume of 1 m³ and a gas introduction unit was installed underneath this insert.

25 kg of iron sheet were introduced into this tube which was open at the top and has the sieve tray and the gas introduction unit underneath. Water, iron(II) nitrate solution and haematite nucleus suspension were subsequently added in such amounts that a volume of 1000 litres was attained and the concentration of nucleus (as $Fe_2O_3$) was 21 g/l and the concentration of iron nitrate (calculated as anhydrous $Fe(NO_3)_2$) was 44 g/l. The mixture was heated to 85° C. and after reaching the temperature sparged with 0.5 m³/h of air (corresponds to 0.5 m³ of air/m³ of reaction volume/h (corresponding to 8 m³ of air/m² of gas introduction area/h) for 48 hours. The reaction mixture is subsequently filtered through a filter press and the haematite pigment obtained is washed with water. The haematite pigment is subsequently dried at 80° C. to a residual moisture content of less than 5% by weight. The dried filtercake is subsequently broken up mechanically by means of a shredder.

Examples 9 to 12 (according to the invention) were carried out in the same reactor on a comparable scale, with the identical conditions and also the identical relative ratios of the amounts of starting materials to the volumes of the solutions being set. The only parameter varied was the gas introduction volumes. The results of the experiments are shown in Table 2.

TABLE 1

Gas introduction volumes (comparative examples)

| Example | Gas introduction volume per reaction volume per time [m3/m3/h] | Gas introduction volume per gas introduction area per time [m³/m²/h] | Pigment quality | kg of $Fe_2O_3$ formed/kg of $Fe(NO_3)_2$ consumed |
|---|---|---|---|---|
| 1 | 1.3 | 1 | Unsatisfactory | 0.4 |
| 2 | 2.7 | 2 | Unsatisfactory | 0.6 |
| 3 | 10 | 7.5 | Good | 1.7 |
| 4 | 12.0 | 9 | Good | 2.1 |
| 5 | 17.3 | 13 | Good | 1.7 |
| 6 | 21.3 | 16 | Good | 1.8 |
| 7 | 28 | 21 | Good | 1.9 |

TABLE 2

Gas introduction volumes (according to the invention)

| Example | Gas introduction volume per reaction volume per time [m3/m3/h] | Gas introduction volume per gas introduction area per time [m³/m²/h] | Pigment quality | kg of $Fe_2O_3$ formed/kg of $Fe(NO_3)_2$ consumed |
|---|---|---|---|---|
| 8 | 0.5 | 8.0 | Good | 2.3 |
| 9 | 0.55 | 9.0 | Good | 2.3 |
| 10 | 0.8 | 13.0 | Good | 2.2 |
| 11 | 1 | 16.0 | Good | 2.1 |
| 12 | 1.3 | 21.0 | Good | 2.0 |

What is claimed is:

1. A process for producing haematite, the process comprising contacting
    iron;
    a water-containing haematite nucleus suspension containing haematite nuclei which have a particle size of 100 nm or less and a specific BET surface area of from 40 $m^2/g$ to 150 $m^2/g$;
    an iron(II) nitrate solution and
    oxygen-containing gas
at temperatures of 70 to 120° C. to produce a liquid reaction mixture which contains at least one liquid phase and haematite suspended therein, wherein the contacting comprises introducing the oxygen-containing gas into the liquid reaction mixture at
    a gas introduction volume of from 0.5 to 2 $m^3$ of oxygen-containing gas per $m^3$ of reaction mixture per hour and a gas introduction volume of from 8 to 32 $m^3$ of oxygen-containing gas per $m^2$ of gas introduction area per hour, or
    a gas introduction volume of from 0.5 to 1 $m^3$ of oxygen-containing gas per $m^3$ of reaction mixture per hour and a gas introduction volume of from 8 to 16 $m^3$ of oxygen-containing gas per $m^2$ of gas introduction area per hour, or
    a gas introduction volume of from 1 to 2 $m^3$ of oxygen-containing gas per $m^3$ of reaction mixture per hour and a gas introduction volume of from 16 to 32 $m^3$ of oxygen-containing gas per $m^2$ of gas introduction area per hour.

2. The process for producing haematite according to claim 1, wherein the contacting is carried out without mechanical mixing and/or without hydraulic mixing.

3. The process for producing haematite according to claim 1, wherein the contacting is carried out with mechanical mixing and/or with hydraulic mixing.

4. The process according to claim 1, further comprising separating the haematite produced from the reaction mixture.

5. The process according to claim 1, wherein the haematite produced has the modification $\alpha$-$Fe_2O_3$.

6. The process according to claim 1, wherein the contacting is carried out in an apparatus comprising:
    a reaction vessel for contacting iron(II) nitrate, haematite nuclei, iron, and oxygen to produce haematite pigment and nitrogen oxide,
    a support for iron, the support comprising a base and an outer delimitation disposed around at least a portion of the base,
    a holder for retaining the support relative to the reaction vessel,
    at least one gas introduction unit disposed relative to the support for introducing oxygen-containing gas to contact iron supported in the support,
    an inlet for introducing a liquid reaction medium of iron(II) nitrate solution, haematite nucleus suspension, and optionally water into the reaction vessel,
    an outlet for removal of a nitrogen oxide-containing stream (NOX), and
    an outlet for removal of haematite pigment suspension.

* * * * *